United States Patent Office 3,260,738
Patented July 12, 1966

3,260,738
HYDRACRYLATE ESTER PRODUCTION
James D. McClure, Berkeley, and Rudolph F. Fischer, Oakland, Calif., assignors to Shell Oil Company, New York, N.Y., a corporation of Delaware
No Drawing. Filed Aug. 9, 1965, Ser. No. 478,452
10 Claims. (Cl. 260—484)

This application is a continuation-in-part of copending application U.S. Serial No. 287,479, filed June 13, 1963, now abandoned.

This invention relates to an improved process for the production of hydracrylic acid esters. More particularly it relates to the production of hydracrylic acid esters via the carbonylation of ethylene oxide.

Reaction of carbon monoxide with olefins and epoxides, i.e., oxirane compounds, is known in the art. The type of product produced in such a process is variable, largely being determined by the particular reaction conditions and the type of additional reactants employed. For example, carbonylation of olefins in the presence of hydrogen has found extensive utilization in the well-known Oxo process. In general, however, greater difficulties are attendant to carbonylation of compounds containing epoxy groups. The greater reactivity of epoxides as compared to olefins typically leads to an abundance of side reactions resulting in a lowering of the yield of desired product. The extent of these side reactions has been found to vary with the severity of reaction conditions, with lower yields of desired products generally being associated with higher reaction temperatures. It would be of considerable advantage, therefore, to employ a more active catalyst, thereby enabling the use of milder reaction conditions whereby side reactions are restricted, and yet obtain high yields of desired product.

It is a principal object of this invention to provide an improved method for the carbonylation of ethylene oxide. More particularly, it is an object of the present invention to provide an improved process for the carbonylation of ethylene oxide, which process, by the method of the present invention, results in the production of alkyl esters of hydracrylic acid. It is a further object to provide a catalyst system that will enable such a carbonylation process to be conducted under unusually mild conditions.

These objects are accomplished by the process which comprises the reaction of ethylene oxide with carbon monoxide in anhydrous alcoholic solution in the presence of a carbonyl-containing carbonylation catalyst. The process of the invention comprises contacting ethylene oxide and catalyst in anhydrous alcoholic solution and treating the resulting mixture with carbon monoxide under conditions of elevated temperature and pressure.

The process of the invention is conducted in anhydrous alcoholic solution in the presence of or alternatively in the absence of added co-solvent. Thus, in one modification of the process of the invention, the solvent consists of an excess of the alcohol which additionally serves as a reactant in the hydracrylate ester production process. In an alternative modification, however, the solvent comprises a mixture of alcohol and other modification, however, the solvent comprises a mixture of alcohol and other co-solvent. Although a variety of co-solvents may be employed, for example oxygen containing co-solvents such as the ethers, e.g., dibutyl ether, diethylene glycol dimethyl ether and dioxane, the esters including butyl propionate and phenyl acetate, and ketones such as acetone and methyl isobutyl ketone; as well as nitrogen-containing co-solvents including nitriles such as acetonitrile and dialkylamides such as dimethylformamide, superior results are obtained when hydrocarbons are employed as co-solvents, and the use of an alcohol-hydrocarbon solvent system is preferred when co-solvent is employed. In this modification the alcohol serves as a co-solvent and also as a reactant, as the type of hydracrylic acid ester that is produced is determined by the particular alcohol present. For example, methyl hydracrylate is obtained as the product when methyl alcohol is present during the carbonylation of ethylene oxide. Although it is possible to conduct the carbonylation in the presence of more than one alcohol, thereby obtaining a mixture of hydracrylate esters, little advantage is obtained by such a process, and in the preferred modification of the invention, only a single alcohol is employed. The presence of alcohol, however, is required, as in the absence of alcohol the initial carbonylation product reacts with additional ethylene oxide to produce a glycol-type ester product. For much the same reason, it is desirable that the presence of water be avoided, as the presence of moisture causes ring opening of the ethylene oxide reactant and thus results in a lowering of the yield of desired product. Although small amounts of water, e.g., 2–3% of the solvent mixture, may be tolerated provided that an excess of ethylene oxide is employed, it is preferred that the alcohol as well as any solvent mixture prepared therefrom be substantially anhydrous. Best results are obtained when the alcohol and any hydrocarbon co-solvent are mutually miscible, that is, form a single phase system.

Although monohydric alcohols are in general satisfactory in the process of the invention, best results are obtained when the alcohol employed is a primary aliphatic alcohol, preferably a primary alkanol of up to 8 carbon atoms. Illustrative of such preferred alkanols are methanol, ethanol, n-propanol, n-butanol, iso-butanol, n-amyl alcohol, n-hexanol, n-octanol, 2-ethylhexanol and the like. Most preferred are primary alkanols having from 1 to 4 carbon atoms, with methanol providing the optimum utilization of the process of the invention.

The hydrocarbon employed as a co-solvent is aliphatic, aromatic or cycloaliphatic hydrocarbon, preferably of from 5 to 12 carbon atoms and free from aliphatic unsaturation, and is liquid at the reaction temperature and pressure. Illustrative aliphatic hydrocarbons are alkanes such as pentane, hexane, octane, isooctane, decane and the like; while cyclo-aliphatic hydrocarbons include cycloalkanes such as cyclohexane, cyclopentane, methylcyclopentane and Decalin; and exemplary aromatic hydrocarbons include benzene, toluene, xylene and ethylbenzene.

The carbonylation solvent comprises the alcohol reactant optionally containing hydrocarbon co-solvent. While the precise composition of the solvent system does not appear to be critical, a ratio too high in hydrocarbon results in a diminished rate of reaction with no apparent compensating advantage. In general, solvent systems comprising alcohol employed in conjunction with up to about 400% by weight of hydrocarbon, based on the alcohol, are satisfactory, although solvent systems comprising alcohol employed in conjunction with up to about 150% by weight of hydrocarbon, on the same basis, are preferred. Particularly good results are obtained when a solvent system comprising alcohol with up to about 20% by weight of hydrocarbon based on the alcohol is utilized, and as previously stated, the presence of any hydrocarbon co-solvent is not required as the alcohol can efficiently serve as both reactant and solvent in the process of the invention.

Best results are obtained when the alcohol is present in molar excess over the ethylene oxide reactant. Molar ratios of alcohol to ethylene oxide from about 2:1 to about 20:1 are satisfactory, while ratios of alcohol to ethylene oxide from about 5:1 to about 10:1 are preferred.

The catalysts employed in the process of the invention are carbonylation catalysts. These catalysts customarily are complexes of transition metals, particularly transition metals of Group VIII of the Periodic Table, wherein the metal is complexed with stabilizing ligands. While such complexes can be prepared from metals such as iron, nickel, osmium and the like, preferred catalysts contain cobalt. By stabilizing ligand is meant a ligand capable of donating an electron pair to form a coordinate bond with the metal, and simultaneously having the ability to accept electrons from the metal, thereby imparting stability to the resulting complex. Examples of such ligands include carbon monoxide, phosphines, arsines and stibines, particularly those phosphines, arsines, and stibines that are tertiary. The cobalt carbonylation catalysts of the invention contain one or more carbon monoxide molecules within the complex, and customarily contain from 3 to 4 molecules of carbon monoxide for each cobalt atom present. A particularly useful catalyst is dicobalt octacarbonyl which is added to the reaction mixture as such or alternatively is prepared in situ as by reaction of an added cobalt compound with the carbon monoxide present in the reaction system. It is equivalently useful, however, to employ modified cobalt carbonyl carbonylation catalysts, wherein one or more of the carbon monoxide ligands of dicobalt octacarbonyl has been replaced by a tertiary phosphine or similar ligand. Preferably, such modified cobalt carbonylation catalysts contain three carbon monoxide ligands and one other stabilizing ligand, e.g., a tertiary phosphine ligand, for each cobalt atom present in the catalyst complex.

As applied to the preferred cobalt carbonyl catalysts, such phosphine-modified catalysts are exemplified by compounds of the formula $(RRRP)_2Co_2(CO)_6$ wherein R is hydrocarbyl, preferably hydrocarbyl of up to 10 carbon atoms, free from aliphatic unsaturation, e.g., alkyl of up to 10 carbon atoms or aryl of up to 10 carbon atoms. Such modified cobalt carbonyl carbonylation catalysts are illustrated by bis(tri-n-butylphosphine)dicobalt hexacarbonyl;
bis(triphenylphosphine)dicobalt hexacarbonyl;
bis(dimethylphenylphosphine)dicobalt hexacarbonyl;
bis(diethylpropylphosphine)dicobalt hexacarbonyl;
(tri-n-butylphosphine)(triethylphosphine)dicobalt hexacarbonyl;
bis(dihexylbenzylphosphine)dicobalt hexacarbonyl and the like.

The modified cobalt carbonyl carbonylation catalysts may be utilized in a variety of ways. Frequently the modified catalysts are prepared by reaction of dicobalt octacarbonyl and tertiary phosphine. Such reaction results in the replacement of carbon monoxide ligands with phosphine ligands. The modified catalyst thus prepared is added to the reaction mixture as a preformed material. Alternately, however, the modified catalysts may be prepared in situ, as by introducing into the reaction mixture dicobalt octacarbonyl and tertiary phosphine. Initial reaction of the phosphine and dicobalt octacarbonyl forms the modified catalyst, which subsequently serves to catalyze the desired carbonylation of the ethylene oxide. While the above discussion has been primarily limited to cobalt carbonyl catalysts modified with phosphine ligands, which catalysts comprise the preferred type of modified cobalt carbonyl carbonylation catalysts, it should be understood that analogous arsine or stibine ligands may alternatively be employed in place of the phosphine ligands to form modified cobalt carbonyl carbonylation catalysts suitable in the process of the invention.

Regardless of the particular catalyst employed, only catalytic amounts of material are required. While optimum catalyst concentrations will vary, catalyst concentrations from about 0.00001 mole to about 0.5 mole of catalyst per mole of the ethylene oxide reactant are satisfactory, with amounts of catalyst from about 0.001 mole to about 0.1 mole per mole of ethylene oxide being preferred.

A principal advantage of the process of the present invention is evidenced in the preferred modification of the process which comprises the use of a cobalt carbonyl carbonylation catalyst in conjunction with a co-catalyst. The use of such a catalyst system enables the carbonylation reaction to be conducted at lower temperatures and lower pressures than when the cobalt carbonyl carbonylation catalyst is employed alone, and yet obtain comparable or superior conversion of reactant and yield of product in equivalent or even shorter reaction time. Such milder reaction conditions enable competing side reactions, particularly the isomerization of ethylene oxide to acetaldehyde, to be minimized with attendant increase in yield of product. Materials found to be suitable co-catalysts for the process of the invention are materials referred to as bases, which may be organic or may be inorganic.

Illustrative of inorganic bases are the alkali metal and alkaline earth hydroxides, e.g., potassium hydroxide, sodium hydroxide, cesium hydroxide, calcium hydroxide and barium hydroxide; and the corresponding alkali metal and alkaline earth oxides, such as sodium oxide, potassium oxide and barium oxide. Also suitable as co-catalysts are salts of strong bases and weak acids, such as potassium bicarbonate, sodium carbonate, rubidium bicarbonate, calcium bicarbonate, potassium acetate, sodium propionate, sodium citrate and the like. Illustrative of other organic bases are the alkoxides, particularly alkali metal salts of primary alcohols, e.g., sodium methoxide and potassium ethoxide; quaternary ammonium hydroxides such as tetramethylammonium hydroxide, dimethylbenzylammonium hydroxide, and tetraethylammonium hydroxide; and alkali metal phenoxides such as sodium phenoxide and potassium para-tert-butylphenoxide.

The preferred co-catalysts for the process of the invention are derivatives of trivalent non-metallic elements of Group V–A of the Periodic Table. By non-metallic Group V–A element is meant those elements of Group V–A having an atomic number of from 7 to 15, that is, nitrogen and phosphorus, as members of Group V–A of higher atomic number are generally considered to have considerable metallic character. Preferred co-catalysts of this class are tertiary amines and tertiary phosphines. In general, best results are obtained through the use of tertiary amines and tertiary phosphines wherein each group bound to the Group V–A atom is hydrocarbyl, that is, contains only carbon and hydrogen and preferably is hydrocarbyl of up to 12 carbon atoms and free from aliphatic unsaturation, although it is also useful to employ amines and phosphines wherein the substituent groups are substituted hydrocarbon, particularly hydrocarbon radicals containing halogen, hydroxy, carboalkoxy, cyano and dialkylamino substituents. Illustrative of the preferred trihydrocarbyl amines and phosphines are trimethylamine, triethylamine, dipropylbutylamine, dimethylbenzylamine, diethyllaurylamine, triphenylamine, diphenylbenzylamine, N,N-dimethylaniline, tri-n-butylphosphine, triphenylphosphine, diethylbenzylphosphine and the like. Also suitable as amine co-catalysts are tertiary amines wherein the nitrogen atom is a member of a heterocyclic ring. Illustrative of such amines are pyridine, the picolines, N-methylpiperidine, N-methylpyrrolidine, quinoline and quinuclidine.

The co-catalyst generally is added to the reaction mixture as a preformed material. It is also useful, however, to prepare the co-catalyst in situ, for example as by adding to the reaction mixture a quaternary ammonium halide. An alternate in situ preparation comprises the addition of ammonia, a primary or secondary amine, or an analogous phosphorus compound. Initial reaction of the latter type of co-catalyst precursor with ethylene oxide results in the production of a hydroxyethyl-substituted tertiary amine or phosphine. For example, the addition of dimethylamine as a co-catalyst precursor results in the formation of (beta-hydroxyethyl)dimethylamine. As the preferred co-catalysts are tertiary hydrocarbyl amines and phosphines, such in situ preparations of co-catalyst are less preferred.

An alternate modification comprises the simultaneous formation of a modified catalyst and the introduction of co-catalyst. In an in situ production of modified cobalt carbonyl carbonylation catalysts, as by introducing dicobalt octacarbonyl and tertiary phosphine into the reaction mixture, excess tertiary phosphine may be added so that subsequent to the formation of the phosphine-modified catalyst, the excess phosphine may serve as co-catalyst for the carbonylation process.

The amounts of co-catalyst employed are approximately of the same order as the amounts of catalyst used. Amounts of co-catalyst from about 0.00001 mole to about 0.5 mole of co-catalyst per mole of ethylene oxide are satisfactory, while amounts of co-catalyst from about 0.001 mole to about 0.1 mole per mole of ethylene oxide are preferred. Best results are obtained when the molar ratio of co-catalyst to catalyst is about 2:1.

The carbonylation reaction is customarily conducted by introducing the ethylene oxide, solvent, catalyst and co-catalyst, if a co-catalyst is employed, into an autoclave, flushing the reactor with an inert gas, e.g., nitrogen, argon, helium and the like, and pressurizing the reactor at or near room temperature with carbon monoxide. The reactor is then heated to the desired reaction temperature and maintained at that temperature until reaction is complete. Best results are obtained when the reaction mixture is agitated during the course of the reaction, as by rocking or shaking the reactor. No special precautions are needed in preparing the ethylene oxide and carbon monoxide for the reaction. Commercially available grades of these reactants are suitable.

The optimum reaction conditions, e.g., reaction time, reaction temperature and reaction pressure will in part be dependent upon the particular catalyst and solvent system employed, and whether or not a co-catalyst has been introduced. Reaction conditions that are overly vigorous produce a high conversion of reactant in short reaction time, but also promote extensive side reactants that result in lowered product yield. Conversely, however, reaction conditions that are too mild, although tending to minimize undesirable side reactions, also result in lowering of reaction rate, so that the process is so slow as to be commercially unattractive.

Reaction temperatures from about 50° C. to about 150° C. are generally satisfactory, although reaction temperatures from about 60° C. to about 100° C. are preferred. Normal reaction times vary from about 2 hours to about 20 hours, although satisfactory results are obtained when reaction times of from about 4 to about 12 hours are employed.

For convenience, carbon monoxide pressures are measured at the time and temperature of carbon monoxide introduction, that is, at or about room temperature, e.g., 20-25°. The carbon monoxide pressure increases, of course, as the reaction mixture is heated. Employing either a dicobalt octacarbonyl catalyst or a bis(tertiary phosphine)dicobalt hexacarbonyl catalyst, effective reaction pressures vary from about 1000 p.s.i. to about 10,000 p.s.i. In the presence of a co-catalyst, a tertiary amine for example, the pressure requirements are lowered. A catalyst system comprising dicobalt octacarbonyl and tertiary amine enables the reaction to be conducted at pressures from about 1000 p.s.i. to about 9000 p.s.i., with pressures from about 2000 p.s.i. to about 8000 p.s.i. being preferred. Preferred pressures when a bis(tertiary phosphine)dicobalt hexacarbonyl catalyst and a tertiary amine co-catalyst are employed range from about 1000 p.s.i. to about 6000 p.s.i., with pressures from about 1000 p.s.i. to about 5000 p.s.i. being most suitable. Similar pressure requirements are noted when tertiary phosphine co-catalysts are employed.

Following reaction, the reaction vessel is depressurized and the product is recovered by conventional means, as by fractional distillation at reduced pressure subsequent to solvent removal. The ester products are colorless liquids at room temperature and atmospheric pressure.

The hydracrylic acid esters produced by the process of the present invention find utility as chemical intermediates, particularly as monomers from which a variety of useful polymeric materials may be obtained. The beta-hydroxypropionic acid esters may be hydrolyzed to form beta-hydroxypropionic acid from which polyesters can be prepared. Alternatively, dehydration of the hydracrylic acid esters by conventional means, e.g., treatment with sodium hydrogen sulfate, results in the formation of acrylate esters, the utility of which is well established in the area of polymers and copolymers.

To further illustrate the process of the present invention, the following examples are provided. It should be understood that the details thereof are not to be regarded as limitations, as they may be varied as will be understood by one skilled in this art.

*Example I*

A solution of 52 g. of ethylene oxide, 5 g. of bis(tri-n-butylphosphine)dicobalt hexacarbonyl and 1.5 g. of benzyldimethylamine in 200 ml. of methanol and 250 ml. of n-hexane was charged to an autoclave at 5° C. The reactor was flushed three times with nitrogen, at which time 50 g. of ethylene oxide remained. Sufficient carbon monoxide was introduced to produce a pressure of 5500 p.s.i., measured at 20° C., and the reaction mixture was heated to 80° C. and maintained at that temperature for 10 hours while the reactor was rocked.

The reaction vessel was cooled and vented and the residual liquid distilled at reduced pressure and temperatures not exceeding 65° C. A total of 74 g. of methyl 3-hydroxypropionate was obtained; the yield was 74% based upon an 82% conversion of ethylene oxide. The analysis of the product was as follows:

|  | Anal. Calc. for $C_4H_8O_3$ | Found |
| --- | --- | --- |
| C, percent wt. | 46.2 | 46.2. |
| H, percent wt. | 7.78 | 7.50. |
| Ester Value | 0.96 eq./100 g. | 0.99 eq./100 g. |

*Example II*

Following the procedure of Example I, similar experiments were conducted, but varying the catalyst, co-catalyst, and reaction time. The results are shown in Table I. All experiments were conducted at 100° C. and 5500 p.s.i.

TABLE I

| Catalyst, mole percent | Time, hrs. | Percent Yield | Percent Conversion of Ethylene Oxide |
| --- | --- | --- | --- |
| $Co_2(CO)_8$, 1.3 | 10 | 50 | 92 |
| $Co_2(CO)_8$, 1.3 plus benzyldimethylamine, 1.5 | 6 | 65 | 93 |
| $[(n-C_4H_9)_3P]_2Co_2(CO)_6$, 0.8 | 10 | 65 | 91 |
| $[(n-C_4H_9)_3P]_2Co_2(CO)_6$, 0.8, plus benzyldimethylamine, 1.5 | 10 | 68 | 91 |

*Example III*

Following the procedure of Example I, similar reactions were conducted, but varying the reaction temperature and pressure. In all cases, the catalyst employed was bis(tri-n-butyl phosphine)dicobalt hexacarbonyl, and the reaction time was 10 hours. The results are shown in Table II.

TABLE II

| Pressure, p.s.i. at 20° C. | Temp., °C. | Percent Yield | Percent Conversion of Ethylene Oxide |
|---|---|---|---|
| 5,500 | 100 | 65 | 91 |
| 5,500 | 80 | 75 | 82 |
| 5,500 | 70 | 80 | 41 |
| 3,500 | 80 | 73 | 62 |
| 2,000 | 80 | 65 | 52 |
| 2,000 [a] | 80 | 70 | 83 |
| 1,500 [a] | 80 | 65 | 82 |
| 1,000 [a] | 80 | 64 | 80 |
| 1,500 [b] | 78 | 55 | 77 |
| 1,500 [c] | 78 | 59 | 73 |

[a] Benzyldimethylamine present as co-catalyst.
[b] Potassium hydroxide present as co-catalyst.
[c] Potassium acetate present as co-catalyst.

A similar reaction conducted at 1500 p.s.i. and 80° C. for 4 hours with added benzyldimethylamine as co-catalyst gave a 70% yield based upon a 65% conversion of ethylene oxide.

*Example IV*

A solution of 52 g. of ethylene oxide, 5 g. of bis(tri-n-butylphosphine)dicobalt hexacarbonyl and 1.5 g. of benzyldimethylamine in 200 ml. of ethanol and 250 ml. of n-hexane was charged to an autoclave at 5° C. and flushed three times with nitrogen. The amount of ethylene oxide remaining in the autoclave was then 50 g. Carbon monoxide was introduced to a pressure of 1950 p.s.i. (20° C.) and rocking of the reactor was started. The reactor was then maintained at 80° C. for five hours. At the end of this time, the vessel was vented and the residual liquid distilled. A total of 17.3 g. of ethyl hydracrylate was obtained, which represented a 24% yield based upon a 55% conversion of ethylene oxide.

*Example V*

By a procedure similar to that of Example IV, several carbonylations of ethylene oxide were conducted employing a 92% wt. ethanol-8% wt. hexane solvent system at a reaction temperature of 80 C. The catalyst and co-catalyst were the same as in Example IV. The results are shown in Table III.

TABLE III

| Pressure, p.s.i. | Time, hrs. | Ethylene Oxide Conversion, percent | Yield Ethyl Hydracrylate, percent |
|---|---|---|---|
| 2,000 | 11 | 83 | 48 |
| 5,000 | 10 | 79 | 62 |

*Example VI*

A series of ethylene oxide carbonylations was conducted employing a solvent system of 92% wt. methanol-8% wt. hexane, a reaction temperature of 70° C., and a pressure of 3200 p.s.i. The catalyst, dicobalt octacarbonyl, was present in a molar concentration of 0.7% based on ethylene oxide, and the co-catalyst employed was N-methylpyrrolidine. The results of this series are shown in Table IV.

TABLE IV

| Molar Ratio, Co-catalyst/Catalyst | Time, hrs. | Ethylene Oxide, Conversion, percent | Yield Methyl Hydracrylate, percent |
|---|---|---|---|
| 2 | 20 | 99 | 74 |
| 2 | 10 | 84 | 72 |
| 1.7 | 16 | 88 | 62 |

*Example VII*

By a procedure similar to that of Example I, carbonylation of ethylene oxide was effected in methanol solvent at a temperature of 70° C. and a reaction pressure of 3200 p.s.i. The catalyst, dicobalt octacarbonyl, was present in a molar concentration of 0.7%, based on the ethylene oxide, and an amount of N-methylpyrrolidine, present to the extent of twice the molar amount of catalyst was employed as co-catalyst. After a reaction time of 20 hours, analysis of the product mixture indicated that the conversion of ethylene oxide was 94% and the yield of methyl hydracrylate, based on ethylene oxide converted, was 65%.

The above experiment was repeated, except that an equivalent amount of dicyclohexylamine was employed in place of the N-methylpyrrolidine. The conversion of ethylene oxide was 82% and the yield of methyl hydracrylate, based on ethylene oxide converted, was 70%.

*Example VIII*

By a procedure similar to that of Example I, ethylene oxide was reacted with carbon monoxide in the presence of bis(tri-n-butylphosphine)dicobalt hexacarbonyl catalyst and a co-catalyst in acetonitrile-methanol solution at 80° C. and 1500 p.s.i. (20° C.) for 10 hours. The results are shown in Table V.

TABLE V

| Co-catalyst | Percent Yield | Percent Conversion of Ethylene Oxide |
|---|---|---|
| Benzyldimethyl amine | 50 | 42 |
| Pyridine | 43 | 45 |

We claim as our invention:

1. In the process for the production of hydracrylate esters by the carbonylation of ethylene oxide with carbon monoxide, the improvement which comprises conducting the carbonylation in substantially anhydrous alcoholic solution comprising primary monohydric alkanol of up to 8 carbon atoms and up to about 400% wt. based on the alkanol of hydrocarbon co-solvent, the molar ratio of said alkanol to ethylene oxide being from about 2:1 to about 20:1, in the presence of from about 0.00001 mole to about 0.5 mole of cobalt carbonyl carbonylation catalyst per mole of ethylene oxide, at a temperature from about 50° C. to about 150° C. and a pressure from about 1000 p.s.i. to about 10,000 p.s.i.

2. The process of claim 1 wherein the alcohol is methanol.

3. The process of claim 1 wherein the alcohol is ethanol.

4. The process of claim 1 wherein the catalyst is dicobalt octacarbonyl.

5. The process of claim 1 wherein the catalyst is bis(tertiary phosphine)dicobalt hexacarbonyl.

6. In the process for the production of hydracrylate esters by carbonylation of ethylene oxide with carbon monoxide, the improvement which comprises conducting the carbonylation in substantially anhydrous alcoholic solution comprising primary monohydric alkanol of up to 8 carbon atoms and up to about 400% by weight based on the alkanol of hydrocarbon co-solvent, the molar ratio of said alkanol to ethylene oxide being from about 2:1 to about 20:1, in the presence of from about 0.00001 mole to about 0.5 mole of cobalt carbonyl carbonylation catalyst per mole of ethylene oxide and from about 0.00001 mole to about 0.5 mole of basic co-catalyst per mole of ethylene oxide, at a temperature of from about 50° C. to about 150° C. and a pressure from about 1000 p.s.i. to about 10,000 p.s.i.

7. The process of claim 6 wherein the co-catalyst is tertiary amine.

8. The process of claim 7 wherein the catalyst is dicobalt octacarbonyl.

9. The process of claim 7 wherein the catalyst is bis(tertiary phosphine)dicobalt hexacarbonyl.

10. The process of claim 6 wherein the alcohol is methanol.

References Cited by the Examiner

UNITED STATES PATENTS

| 2,782,226 | 2/1957 | Seon | 260—484 |
| 3,028,417 | 4/1962 | Eisenmann | 260—484 |

LORRAINE A. WEINBERGER, *Primary Examiner.*

A. P. HALLUIN, *Assistant Examiner.*